US006683722B2

United States Patent
Ogi

(10) Patent No.: US 6,683,722 B2
(45) Date of Patent: Jan. 27, 2004

(54) ROD LENS ARRAY

(75) Inventor: Shuya Ogi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/108,887

(22) Filed: Mar. 29, 2002

(65) Prior Publication Data

US 2002/0196561 A1 Dec. 26, 2002

(30) Foreign Application Priority Data

Apr. 2, 2001 (JP) ..................... P2001-102951
Feb. 15, 2002 (JP) ..................... P2002-039270

(51) Int. Cl.[7] ............... G02B 27/10; G02B 9/00
(52) U.S. Cl. ..................... 359/619; 359/654
(58) Field of Search ................. 359/619, 620, 359/621, 622, 652, 653, 654, 708, 710

(56) References Cited

U.S. PATENT DOCUMENTS 5,978,146 A 11/1999 Kittaka et al.
6,088,164 A * 7/2000 Fukasawa ............ 359/619
6,429,977 B2 * 8/2002 Kittaka ............... 359/654
2002/0063964 A1 * 5/2002 Toyama ............... 359/619

FOREIGN PATENT DOCUMENTS

TW          P-37942          3/2003

* cited by examiner

*Primary Examiner*—Ricky Mack
*Assistant Examiner*—Alicia Harrington
(74) *Attorney, Agent, or Firm*—Whitham, Curtis & Christofferson, P.C.

(57) ABSTRACT

A rod lens array having a structure in which a large number of rod lens elements are combined into one unit while the large number of rod lens elements are arrayed in a plurality of rows. The number N of lens rows and the degree $m$ of overlapping of images are selected to satisfy the relation:

$$\{3(N-1)N/16\}^{1/2} < m \leq \{N(N+1)(28-N)/(9-N)\}^{1/2}/4$$

when $m$ is equal to $X_0/D$, in which D is the diameter of each lens, and $X_0$ is the radius of a view field generated by each lens.

19 Claims, 4 Drawing Sheets

ROD LENS ARRAY

BACKGROUND OF THE INVENTION

The present invention relates to a rod lens array having a structure in which a large number of rod lens elements are combined into one unit while the large number of rod lens elements are arrayed in a plurality of rows, and an image-forming device using the rod lens array. More specifically, the invention relates to a rod lens array in which efficiency (brightness) can be improved in spite of the smallest number of lens rows by defining the relation between the number N of lens element rows and the degree $m$ of overlapping of images while paying attention to the correlation therebetween, an image-forming device using the rod lens array, and a method of producing the rod lens array. This technique is useful for an image-forming device having a linear scanning type optical system such as a reading system of a scanner or a writing system of an LED printer.

A rod lens array is a light-convergent lens component having a structure in which a large number of rod lens elements each having a radially gradient index distribution are arrayed in parallel rows and, for example, impregnated/filled with a black silicone resin to thereby be combined into one unit. The rod lens array is designed so that images generated by adjacent lens elements are laid to overlap each other to thereby form one continuous correct unit-magnification image as a whole. Because the optical path length of the rod lens array is so short that it is unnecessary to use any inversion mirror, the rod lens array can be applied to a small-sized device. Hence, the rod lens array can be used popularly for an image-forming device in a linear scanning type optical system such as a scanner or a printer.

In the rod lens array used in such a linear scanning optical system, resolution is regarded as more important than brightness, so that the $m$ value (the degree of overlapping of images) is selected to be a slightly large value. There is, however, the case where it is necessary to keep brightness as high as possible in accordance with the purpose. In this case, image unevenness is improved by electrical correction of light quantity and sensitivity. Even in this case, such a lens array having a good $m$ value is used for the sake of suppression of cyclic light quantity unevenness.

As described above, when the rod lens array is used in a linear scanning type optical system, the brightness of the rod lens array decreases as the $m$ value of the rod lens array increases under the condition that the number of lens rows is not changed. In the related art, the rod lens array used is not designed to be sufficiently advantageous in light quantity. Hence, in the related art, a large burden is imposed on a light source, or a sensor/photoconductor drum, so that the processing speed of the system (such as the reading speed of a scanner or the printing speed of a printer) is not improved as sufficiently as expected.

SUMMARY OF THE INVENTION

An object of the present invention is to provide a rod lens array having a structure advantageous in light quantity on the assumption of limitation in dimensions such as operating distance and conjugate length. Another object of the invention is to provide a multi-row rod lens array by which brightness and reduction of image unevenness can be achieved simultaneously to a certain degree, and a method of producing the rod lens array.

According to invention, there is provided a rod lens array having a structure in which a large number of rod lens elements are combined into one unit while the large number of rod lens elements are arrayed in a plurality of rows, wherein a number N of lens rows and a degree $m$ of overlapping of images satisfy the relations:

$$\{3(N-1)N/16\}^{1/2} < m \leq \{N(N+1)(28-N)/(9-N)\}^{1/2}/4,$$

and $$N \leq 8$$

When $m$ is equal to $X_0/D$, in which D is a diameter of each lens, and $X_0$ is a radius of a view field generated by each lens.

Further, according to the invention, there is provided a rod lens array having a structure in which a large number of rod lens elements are combined into one unit while the large number of rod lens elements are arrayed in a plurality of rows, wherein a number N of lens rows and a degree $m$ of overlapping of images satisfy the relations:

$$\{3(N-1)N/16\}^{1/2} < m \leq \{N(N+1)(58-N)/(19-N)\}^{1/2}/4.$$

Further, according to the invention, there is provided a rod lens array having a structure in which a large number of rod lens elements are combined into one unit while the large number of rod lens elements are arrayed in a plurality of rows, wherein a number N of lens rows and a degree $m$ of overlapping of images satisfy the relations:

$$\{3(N-1)N/16\}^{1/2} < m \leq \{3N(N+1)/16\}^{1/2}.$$

According to the invention, there is provided a rod lens array having a structure in which a large number of rod lens elements are combined into one unit while the large number of rod lens elements are arrayed in a plurality of rows, wherein a number N of lens rows and a degree $m$ of overlapping of images satisfy the relations:

$$\{3(N-1)(N+1)/16\}^{1/2} - 0.1 \leq m \leq \{3(N-1)(N+1)/16\}^{1/2} + 0.1.$$

In these rod lenses, the number of lens rows is preferably selected to be not smaller than 6 in order to simultaneously achieve brightness and reduction of image unevenness to a certain degree.

Alternatively, according to the present invention, there is provided a rod lens array having a structure in which a large number of rod lens elements are combined into one unit while the large number of rod lens elements are arrayed in a plurality of rows, wherein a number N of lens rows, not smaller than 2 but not larger than 7, and a degree $m$ of overlapping of images satisfy either one of the relations depending on a value of the number N:

in case of N=2, $m$ is in a range of 0.61 to 1.32;
in case of N=3, $m$ is in a range of 1.32 to 1.50;
in case of N=4, $m$ is in a range of 1.50 to 2.18;
in case of N=5, $m$ is in a range of 2.18 to 2.37;
in case of N=6, $m$ is in a range of 2.37 to 3.04; and
in case of N=7, $m$ is in a range of 3.04 to 3.24.

The present disclosure relates to the subject matter contained in Japanese patent application Nos. 2001-102951 (filed on Apr. 2, 2001) and 2002-39270 (filed on Feb. 15, 2002), where are expressly incorporated herein by reference in their entireties.

DETAILED DESCRIPTION OF THE INVENTION

Basic Principle

Figure 1:
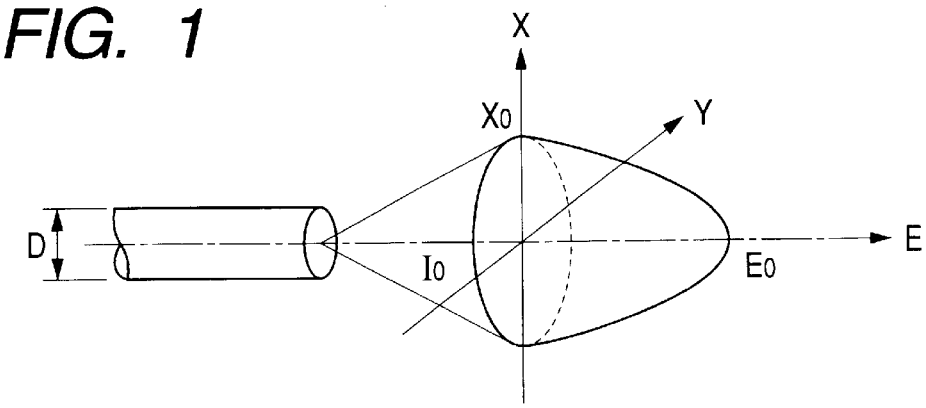
FIG. 1 is an explanatory view showing the illuminance distribution of an image generated by a single gradient-index rod lens.

The illuminance distribution E(x, y) of an image generated by a single gradient-index rod lens is expressed in a rotational paraboloid which is as shown in FIG. 1 and which is given by the following equation.

$$E(x, y) = (E_0/x_0) \cdot \{x_0^2 - x^2 - y^2\}^{1/2}$$

Figure 2:
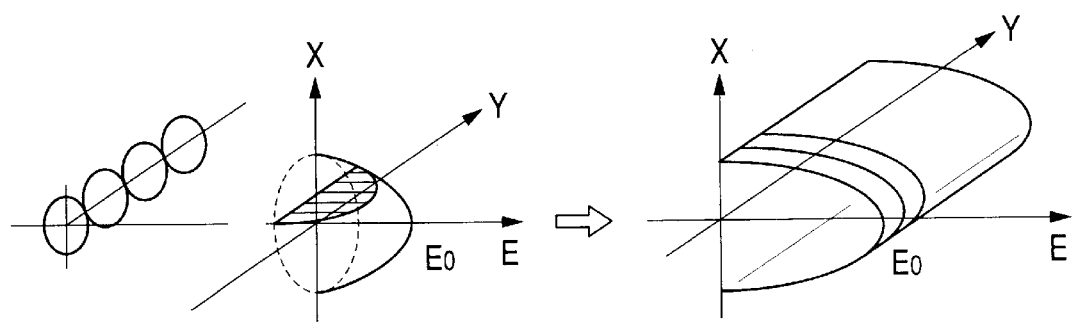
FIG. 2 is an explanatory view showing the illuminance distribution of a rod lens array having one lens row.

Thus, a parabola is described on an E-x plane. The illuminance distribution of one rod lens array constituted by such rod lenses arranged linearly in one row can be expressed in a pillar model having parabola-shaped sections as shown in FIG. 2. When the illuminance distribution on this occasion is compared with the image-surface illuminance of a spherical lens, an equivalent F value can be given by the following equation:

$$F = (m/2\pi)^{1/2} \cdot (1/\theta_0)$$

in which m is the degree of overlapping of images, and $\theta_0$ is the angle (rad) of aperture.

Figure 3:
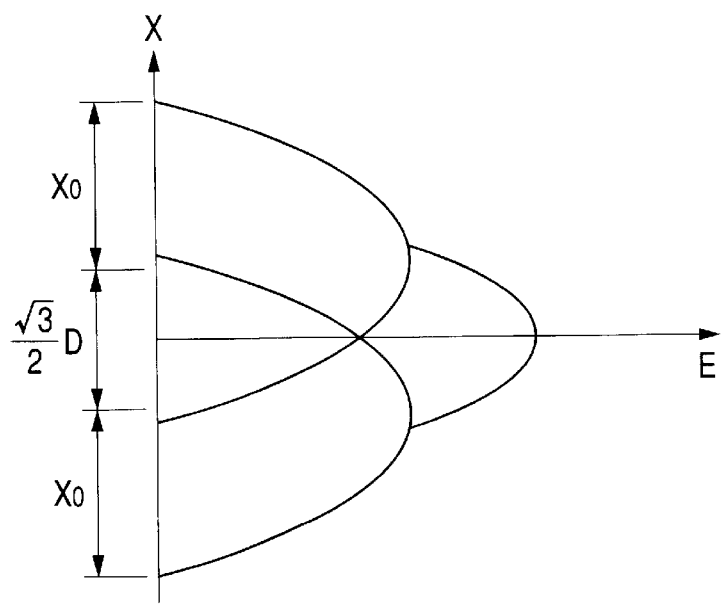
FIG. 3 is an explanatory view showing the illuminance distribution of a rod lens array having two lens rows.

When the illuminance distribution of an N-row lens array (in which N is an integer of not smaller than 2) is expressed in overlap of the parabola distributions as shown in FIG. 3, an equivalent F value in the case of a linear scanning system is given by the following equation:

$$F = \{m/(2\pi K_N)\}^{1/2} \cdot (1/\theta_0) \quad (1)$$

in which $K_N$ is a value varying in according to the number N of rows and is given by the following equations.

$$K_1 = 1 \quad (2)$$
$$K_2 = 2 - 3/(8m^2)$$
$$K_3 = 3 - 3/(2m^2)$$
$$K_4 = 4 - 15/(4m^2)$$
$$\vdots$$
$$K_N = N - (N-1)N(N+1)/(16m^2)$$

As seen from the above, a preferable range of an m value can be defined in accordance with a number of lens rows using an equivalent F value. However, in practical application, there is a case that it is desirable to more directly ensure a minimal value of light quantity (intensity). In such a case, it is preferable to overlap (superimpose) spheroidal intensity distributions of rod lenses together to obtain a total intensity distribution, to thereby define a range of m value in each number of lens rows in view of a minimal intensity value of the total intensity distribution.

Embodiments

Figure 4:
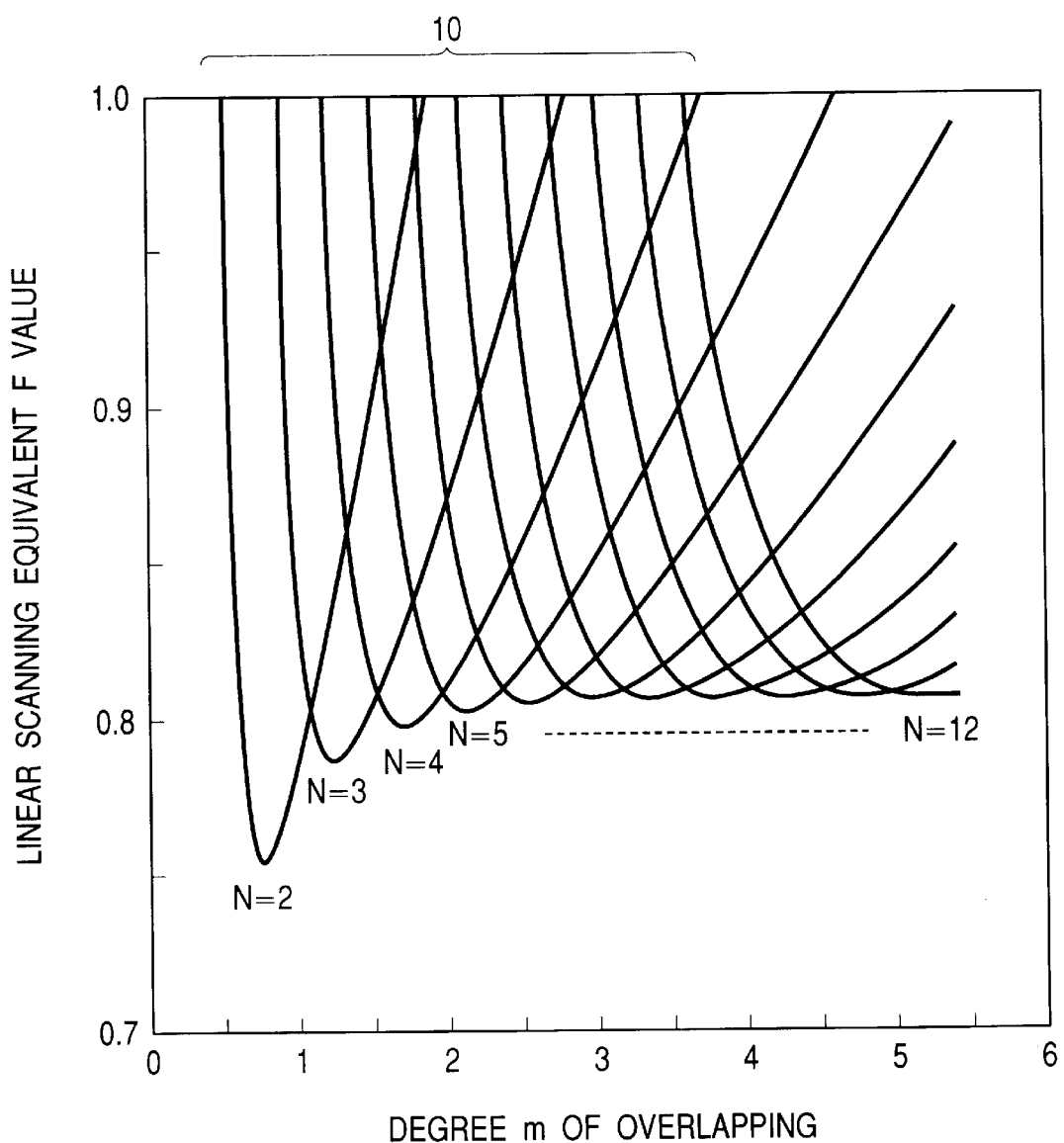
FIG. 4 is a graph of F-m curves showing the relation between equivalent F value and m value.

FIG. 4 shows calculation results of the change of the linear scanning equivalent F value versus the degree m of overlapping in the case where a rod lens array of from 2 to 12 rows with an angle $\theta_0 = 22.7°$ of aperture is applied to a linear scanning system. The equivalent F value is obtained by "conversion referring to the center illuminance after the light quantity distribution of a multi-row array is obtained as an overlap of parabola distributions each of which is taken in the direction of the thickness of a one-row array and each of which is regarded as a parabola distribution uniform in the lengthwise direction". Incidentally, FIG. 4 shows the case where the angle $\theta_0$ of aperture is 22.7°. However, even in the case where the angle of aperture takes another value, the positions (m values) of the points of intersection among curves in accordance with the number of rows do not change except that the absolute value of the angle of aperture changes in terms of inverse ratio.

A subject of the invention is a rod lens array having a structure in which a large number of gradient-index rod lenses are combined into one unit while the large number of rod lenses are arrayed in a plurality of rows. In the invention, the relation between the number N of lens rows and the degree m of overlapping of images is defined on the basis of the technical background.

In each of F-m curves shown in FIG. 4, points of intersection between the curve in N−1 rows and the curve in N rows and between the curve in N rows and the curve in N+1 rows are obtained. From the equation (1), the condition that the F value in a lens array of N rows becomes equal to the F value in a lens array of N+1 rows when the m value is kept constant and the lens arrays use lens elements equal in configuration is given by the following equation.

$$K_N = K_{N+1} \quad (3)$$

Hence, the equation (2) is put into the equation (3) as follows.

$$N - (N-1)N(N+1)/(16m_{N+1}^2) = \quad (4)$$
$$N + 1 - N(N+1)(N+2)/(16m_{N+1}^2)$$
$$3N(N+1)/16m_{N+1}^2 = 1$$
$$\therefore m_{N+1} = \{3(N+1)/16\}^{1/2}$$

Similarly, the m value to make the F value in the lens array of N−1 rows equal to the F value in the lens array of N rows is given by the following equation.

$$m_{N-1} = \{3(N-1)N/16\}^{1/2} \quad (5)$$

From the equations (4) and (5), "a rod lens array having a required minimum value of rows optimal in terms of light quantity in accordance with each m value" or "an m value range optimal in terms of light quantity in rod lens arrays of respective numbers of rows" can be given by combination of the m value and the number N of rows satisfying the following relation.

$$\{3(N-1)N/16\}^{1/2} < m \leq \{3N(N+1)/16\}^{1/2}$$

Then, from the point of view of reducing the number of lens rows as much as possible, it is conceived that the m value range is widened so that "N rows can be used unless the light quantity reaches $100\alpha$ % ($0<\alpha<1$) of that in N+1 rows". The light quantity ratio of lens arrays having identical lens elements and m values but different numbers of rows is given by the ratio of $K_N$ on the basis of the equation (1) and the fact that "light quantity is proportional to $F^{-2}$". Hence, when $m_{N+1}'$ is the degree of overlapping to make the light quantity of the lens array of N rows equal to $100\alpha$ % of the light quantity of the lens array of N+1 rows, the following equation is obtained from the equation (2).

$$N - (N-1)N(N+1)/(16m_{N+1}'^2) = \quad (6)$$
$$\alpha\{N+1 - N(N+1)(N+2)/(16m_{N+1}'^2)\}$$
$$\therefore m_{N+1}' =$$
$$[N(N+1)\cdot\{\alpha(N+2)-(N-1)\}/\{\alpha(N+1)-N\}]^{1/2}/4$$

(Case A)

When the light quantity is allowed to be reduced by at most 10% of the light quantity of the lens array larger in number of lens rows by one row, the relation between the m value and the number N of rows is given by putting $\alpha=0.9$ in the equation (6).

$$\{3(N-1)N/16\}^{1/2} < m \leq \{N(N+1)(28-N)/(9-N)\}^{1/2}/4$$

(Case B)

When the light quantity is allowed to be reduced by at most 5% of the light quantity of the lens array larger in number of lens rows by one row, the relation between the m value and the number N of rows is given by putting $\alpha=0.95$ in the equation (6).

$$\{3(N-1)N/16\}^{1/2} < m \leq \{N(N+1)(58-N)/(19-N)\}^{1/2}/4$$

(Case C)

The smallest number of lens rows to obtain the largest light quantity is given relative to the m value range.

$$\{3(N-1)N/16\}^{1/2} < m \leq \{3N(N+1)/16\}^{1/2}$$

This corresponds to the case of $\alpha=1$ in the equation (6).

The cases A and B are intended to minimize the number of rows as much as possible. In the case A, there is set a range in which improvement of illuminance by about 10% at maximum can be grasped relatively easily by increase of the light source side output (for example, the LED array side output). In the case B, there is set a range in which improvement of illuminance by about 5% at maximum can be grasped relatively easily by increase of the light source side output (for example, the LED array side output). In the case C, the range is self-determined on the basis of points of intersection between F-m curves. Table 1 shows numerical values of lower and upper limits of the respective ranges.

TABLE 1

| Number of Rows (N) | Lower Limit of m Value | Upper Limit of m Value | | |
|---|---|---|---|---|
| | | Case A | Case B | Case C |
| 2 | 0.61 | 1.18 | 1.11 | 1.06 |
| 3 | 1.06 | 1.77 | 1.61 | 1.50 |
| 4 | 1.50 | 2.45 | 2.12 | 1.94 |
| 5 | 1.94 | 3.28 | 2.66 | 2.37 |

TABLE 1-continued

| Number of Rows (N) | Lower Limit of m Value | Upper Limit of m Value | | |
|---|---|---|---|---|
| | | Case A | Case B | Case C |
| 6 | 2.37 | 4.39 | 3.24 | 2.81 |
| 7 | 2.81 | 6.06 | 3.86 | 3.24 |
| 8 | 3.24 | 9.49 | 4.52 | 3.67 |
| 9 | 3.67 | — | 5.25 | 4.11 |
| 10 | 4.11 | — | 6.06 | 4.54 |
| 11 | 4.54 | — | 6.96 | 4.97 |
| 12 | 4.97 | — | 8.00 | 5.41 |

Further, the local minimum values of F-m curves in accordance with the numbers of lens rows are obtained. From the equation (1), the following equation is given.

$$F^2 = 1/(2\pi\theta_0^2)\cdot(m/K_N)$$

This is replaced by $A\cdot g(m)$ in which A is equal to $1/(2\pi\theta_0^2)$. From the equation (2), the following equation is given.

$$g(m) = m/K_N 16m^3\{16Nm^2-(N-1)\cdot N\cdot(N+1)\}dg(m)/dm = 16Nm^2\{16m^2-3(N-1)(N+1)\}/\{16Nm^2-(N-1)\cdot N\cdot(N+1)\}^2$$

From $dg(m)/dm$ 0, $g(m)$, that is, the degree $m_0$ of overlapping to locally minimize F is given as follows.

$$m_0 = \{3(N-1)(N+1)/16\}^{1/2} \quad (7)$$

This shows the m value which is most advantageous in terms of light quantity in each lens array having a predetermined number of rows.

(Case D)

The m value to locally maximize illuminance in accordance with the number N of lens rows is obtained on the basis of the equation (7) but the m value actually varies by a range of about ±0.1. In consideration of the variation in the m value, a product most advantageous in terms of illuminance can be obtained when a rod lens is designed to satisfy the following relation.

$$\{3(N-1)(N+1)/16\}^{1/2} - 0.1 \leq m \leq \{3(N-1)(N+1)/16\}^{1/2} + 0.1$$

This corresponds to the range of $m_0 \pm 0.1$ in the equation (7). Table 2 shows numeral values of optimum, lower and upper limits in the respective numbers of rows.

TABLE 2

| Number of Rows (N) | $m_0$ | $M_0 - 0.1$ | $m_0 + 0.1$ |
|---|---|---|---|
| 2 | 0.75 | 0.65 | 0.85 |
| 3 | 1.22 | 1.12 | 1.32 |
| 4 | 1.68 | 1.58 | 1.78 |
| 5 | 2.12 | 2.02 | 2.22 |
| 6 | 2.56 | 2.46 | 2.66 |
| 7 | 3.00 | 2.90 | 3.10 |
| 8 | 3.44 | 3.34 | 3.54 |
| 9 | 3.87 | 3.77 | 3.97 |
| 10 | 4.31 | 4.21 | 4.41 |
| 11 | 4.74 | 4.64 | 4.84 |
| 12 | 5.18 | 5.08 | 5.28 |

Incidentally, the number N of lens rows is selected to satisfy the relation $N \geq 2$. Even in the case of N=1, a rod lens array can be put into practical use. In this case, however, when the invention is applied, the optimal m value becomes so small that there is little overlap of images. Hence, it is unsuitable to apply the invention to the case of one row in order to determine the m value. Incidentally, in the case A, it is necessary to satisfy the relation $N \leq 8$ as is obvious from Table 1.

Incidentally, in the case of a multi-row array, it is necessary to make the degree m of overlapping large to a certain degree. If not so, this case becomes substantially equal to the case of an array having a smaller number of rows because light from the outer row cannot reach the center of the lens array. Because the equivalent F value in the invention is considered as the sum of light from all rows of lenses, it is necessary to achieve a state in which light from each row reaches the center of the lens array in a corresponding m value range. Hence, in a multi-row array, the optimal m value range becomes relatively large. In the case of a smaller number of rows, the m value range in the invention is not good in terms of reduction of image unevenness. In the case of a larger number of rows (for example, six or more rows), however, reduction of image unevenness and brightness can be achieved simultaneously to a certain degree. It is therefore preferable that the number of lens rows is selected to be not smaller than 6.

To design and produce a rod lens array having an optimal number N of rows in accordance with a given m value, the relation at points of intersection between adjacent F-m curves (see FIG. 4) is solved with respect to the number N of rows to thereby obtain the following equation:

$$N = INT\left\{\frac{0.99 + \sqrt{1 + \frac{64}{3}m^2}}{2}\right\}$$ [Expression 4]

in which INT(x) is a function giving the maximum integer which does not exceed x. The value "0.99" is used in INT(x) so that a smaller number of rows can be selected in the case of m values at points of intersection.

It is, however, impossible to obtain the equation easily at other points than the points of intersection. Therefore, upper limits of m values (in the cases A and B) obtained as numerical values for a $\propto=0.9$ and 0.95 are used and m is replaced by a function f(m) to obtain the following equation.

$$N = INT\left\{\frac{1 + \sqrt{1 + \frac{64}{3}\{f(m)\}^2}}{2}\right\}$$ [Expression 5]

Figure 5:
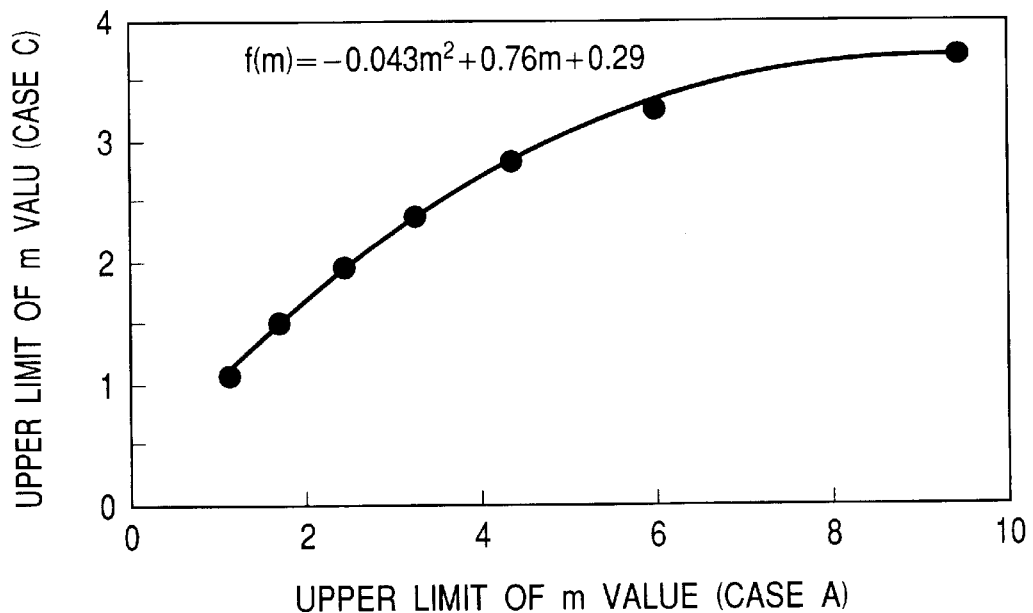
FIG. 5 is a graph showing the relation between the m value at each point of intersection and the upper limit of the m value in Case A.
Figure 6:
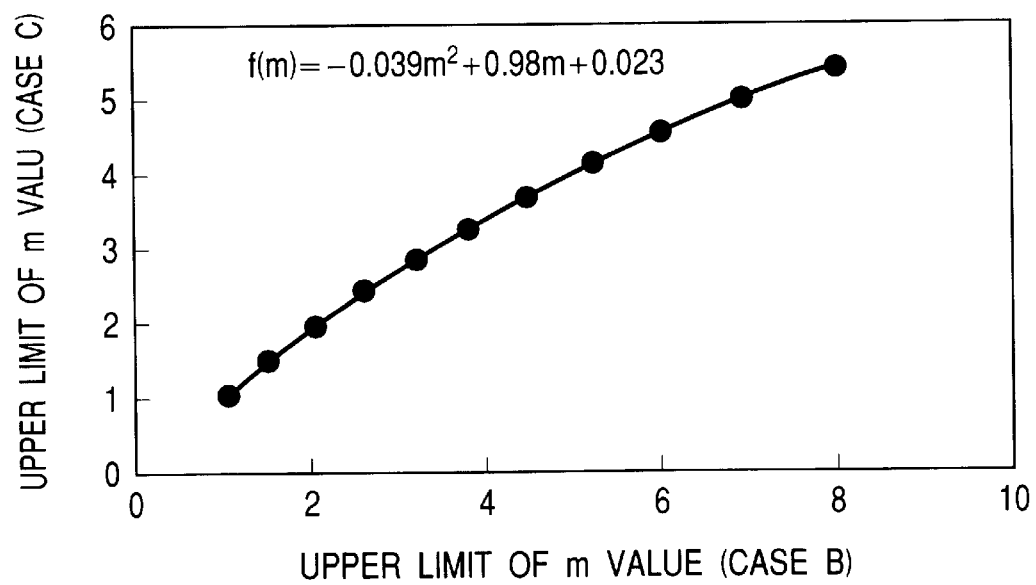
FIG. 6 is a graph showing the relation between the m value at each point of intersection and the upper limit of the m value in Case B.

This equation is used to obtain the number N of rows. That is, f(m) is a function for converting the upper limit of the m value into the m value at each point of intersection for $\propto \neq 1$. FIGS. 5 and 6 show the relation between the upper limit of the m value of Case A and the m value at each point of intersection (Case C), and the relation between the upper limit of the m value of Case B and the m value at each point of intersection (Case C), respectively. It has been found that these curves can be polymonially approximated by quadrics relatively well. Specifically, the function is obtained as follows.

Case A: $f(m) = -0.043m^2 + 0.76m + 0.29$
Case B: $f(m) = -0.039m^2 + 0.98m + 0.023$ Hence, f(m) obtained on the basis of these relations is put into the equation (5) to obtain the number N of lens rows.

The above description is directed to definitions using F value for a spherical lens, and provides a general guideline for obtaining an efficient combination of the number of lens rows and the image overlapping degree, which can increase an average value of light quantity (intensity) of a rod lens array. However, in case that a rod lens array is actually assembled into a device, in particular, that the importance is given to the intensity and thus the device must be designed to obtain the highest possible intensity, the design optimal in terms of the average intensity value might not be a perfect solution applicable as an actual design for the device. In this case, it is preferable to overlap spheroidal intensity distributions of rod lenses together to obtain a total intensity distribution, to thereby define a range of m value in each number of lens rows in view of a minimal intensity value of the total intensity distribution.

Figure 7:
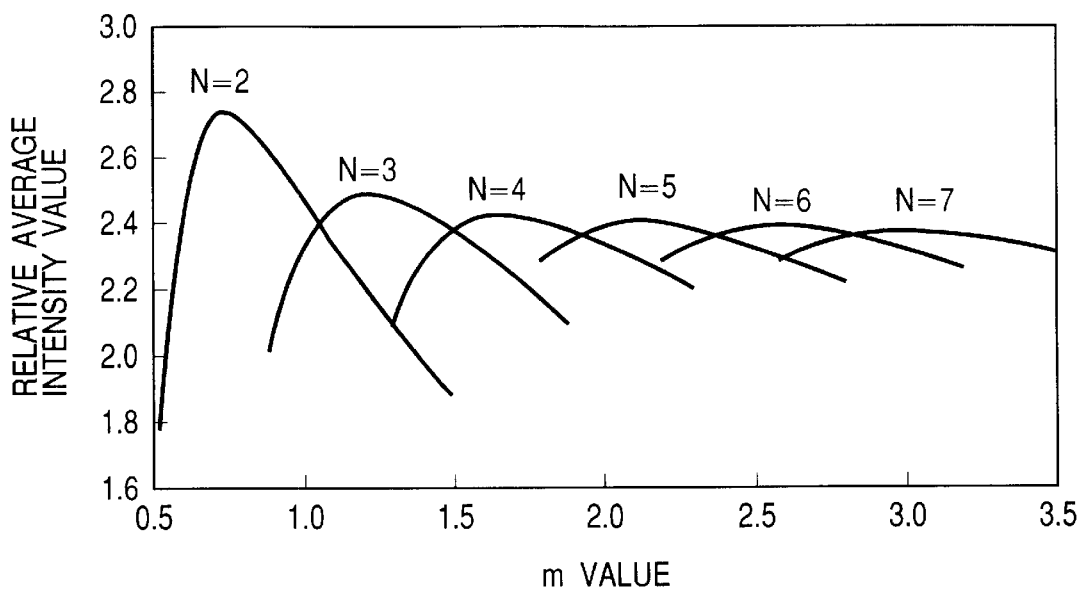
FIG. 7 is a graph showing the relation between the average intensity value and the m value using a number of lens rows as parameter.
Figure 8:
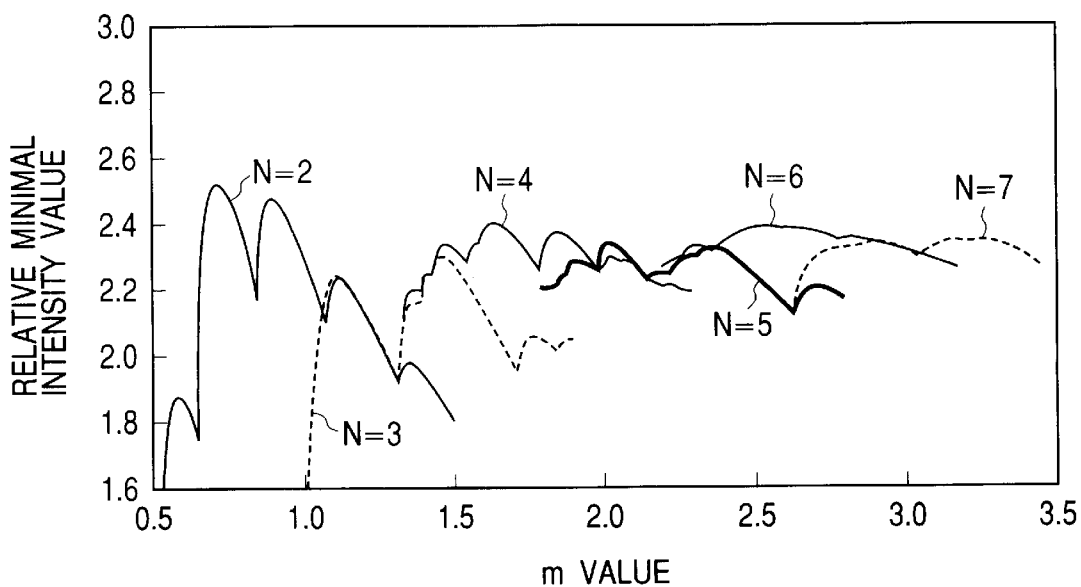
FIG. 8 is a graph showing the relation between the minimal intensity value and the m value using a number of lens rows as parameter.

Accordingly, using rod lenses each having numerical aperture θ=11.5° and lens element diameter D=1.085 mm, an average intensity value and a minimal intensity value both on a lens array center were obtained in terms of a number N of lens rows and an m value by overlapping half-spheroidal intensity distributions of the rod lenses, while taking into consideration a known cosine powered-by-forth rule. FIGS. 7 and 8 show the results. The relations of an F value and an m value as mentioned above well-corresponded to the obtained relations of an average intensity value and an m value. It was found, from the results of FIGS. 7 and 8, that a periodic intensity unevenness in a lens array having an odd number of lens rows was relatively large in comparison to that in a lens array having an even number of lens rows. Accordingly, since the mere addition of one row for change from an even number of lens rows to an odd number of lens rows does not contribute to the increase in minimal intensity value, there is a range for an m value where an even number of lens rows should be used without change.

Based on the result of FIG. 8, table 3 shows a minimal number of lens rows, which provides the highest minimal intensity value in case of an m value ranging from 0.61 to 3.24. In addition, since a periodic intensity unevenness is not large even in an odd number of lens rows in a range of m>3.24, any substantial difference from the optimal design based on the average intensity value is not caused.

TABLE 3

| Number N of lens rows | Lower limit of m value | Upper limit of m value |
|---|---|---|
| 2 | 0.61 | 1.32 |
| 3 | 1.32 | 1.50 |
| 4 | 1.50 | 2.18 |
| 5 | 2.18 | 2.37 |
| 6 | 2.37 | 3.04 |
| 7 | 3.04 | 3.24 |

The range for an m value, defined based on the minimal intensity value, is included in the case C based on equivalent F value, when a number of lens rows is 3 or more. However, when a number of lens rows is 2, the characteristic is somewhat overlapped with the case where a number of lens row is 3, especially in a range where an m value is large, and therefore, if a priority is given to such a design as to reduce a number of lens row as much as possible, the range for an m value (an upper limit side) is exceptionally enlarged in comparison to the case C.

Note that, although calculation results for the lens array of the aforementioned specific device was discussed here, almost same results can be obtained for any other devices.

The multi-row rod lens array obtained in this manner is used in an image-forming device having a linear scanning type optical system such as a reading system of a scanner or a writing system of an LED printer.

As described above, a subject of the invention is a rod lens array in which the relation between the number N of lens element rows and the degree m of overlapping of images is defined in a predetermined range while attention is paid to the correlation therebetween. Hence, efficiency (brightness) can be improved even in the case where the number of lens rows is smallest. Because the rod lens array can be designed sufficiently advantageously in terms of light quantity, the burden imposed on a light source, a sensor/photoconductor drum or the like can be lightened. Hence, the processing speed of the image-forming device as a system (such as the reading speed of a scanner or the printing speed of a printer) can be improved as intended.

Particularly when the invention is applied to a multi-row rod lens array having six or more rows, the optimal m value range can be widened to a certain degree so that good characteristic in which reduction of image unevenness and brightness are achieved simultaneously can be obtained. In addition, brightness can be kept even in the case where the degree of overlapping cannot but be made large to a certain degree because of size limitation caused by the lens characteristic such as operating distance, conjugate length or the like.

What is claimed is:

1. A rod lens array having a structure in which a large number of rod lens elements are combined into one unit while the large number of rod lens elements are arrayed in a plurality of rows, wherein a number N of lens rows and a degree m of overlapping of images satisfy the relations:

$$\{3(N-1)N/16\}^{1/2} < m \leq \{N(N+1)(28-N)/(9-N)\}^{1/2}/4,$$

and $$N \leq 8$$

when m is equal to $X_0/D$, in which D is a diameter of each lens, and $X_0$ is a radius of a view field generated by each lens.

2. A rod lens array according to claim 1, wherein the number of lens rows is not smaller than 6.

3. An image-forming device using a rod lens array defined in claim 2.

4. An image-forming device using a rod lens array defined in claim 1.

5. A rod lens array having a structure in which a large number of rod lens elements are combined into one unit while the large number of rod lens elements are arrayed in a plurality of rows, wherein a number N of lens rows and a degree m of overlapping of images satisfy the relations:

$$\{3(N-1)N/16\}^{1/2} < m \leq \{N(N+1)(58-N)/(19-N)\}^{1/2}/4$$

when m is equal to $X_0/D$, in which D is a diameter of each lens, and $X_0$ is a radius of a view field generated by each lens.

6. A rod lens array according to claim 5, wherein the number of lens rows is not smaller than 6.

7. An image-forming device using a rod lens array defined in claim 5.

8. A rod lens array having a structure in which a large number of rod lens elements are combined into one unit while the large number of rod lens elements are arrayed in a plurality of rows, wherein a number N of lens rows and a degree m of overlapping of images satisfy the relations:

$$\{3(N-1)N/16\}^{1/2} < m \leq \{3N(N+1)/16\}^{1/2}$$

when m is equal to $X_0/D$, in which D is a diameter of each lens, and $X_0$ is a radius of a view field generated by each lens.

9. A rod lens array according to claim 8, wherein the number of lens rows is not smaller than 6.

10. An image-forming device using a rod lens array defined in claim 8.

11. A rod lens array having a structure in which a large number of rod lens elements are combined into one unit while the large number of rod lens elements are arrayed in a plurality of rows, wherein a number N of lens rows and a degree m of overlapping of images satisfy the relations:

$$\{3(N-1)(N+1)/16\}^{1/2} - 0.1 \leq m \leq \{3(N-1)(N+1)16\}^{1/2} + 0.1$$

when m is equal to $X_0/D$, in which D is a diameter of each lens, and $X_0$ is a radius of a view field generated by each lens.

12. A rod lens array according to claim 11, wherein the number of lens rows is not smaller than 6.

13. An image-forming device using a rod lens array defined in claim 11.

14. A rod lens array having a structure in which a large number of rod lens elements are combined into one unit while the large number of rod lens elements are arrayed in a plurality of rows, wherein a number N of lens rows, not smaller than 2 but not larger than 7, and a degree m of overlapping of images satisfy either one of the relations depending on a value of the number N:

in case of N=2, m is in a range of 0.61 to 1.32;
in case of N=3, m is in a range of 1.32 to 1.50;
in case of N=4, m is in a range of 1.50 to 2.18;
in case of N=5, m is in a range of 2.18 to 2.37;
in case of N=6, m is in a range of 2.37 to 3.04; and
in case of N=7, m is in a range of 3.04 to 3.24.

15. An image-forming device which uses a rod lens array defined in claim 14, and intensity of which is corrected based on a minimal intensity value.

16. An image-forming device using a rod lens array defined in claim 14.

17. A method of producing a rod lens array, comprising the steps of: arraying a large number of rod lens elements in a plurality of rows; and filling gaps with a resin to thereby combine said large number of rod lens elements into one unit, wherein a number N of lens rows is selected to be an integer value given by an expression:

$$N = INT\left\{\frac{1 + \sqrt{1 + \frac{64}{3}\{f(m)\}^2}}{2}\right\} \quad \text{[Expression 1]}$$

in which f(m) is given by an expression:

$$f(m) = -0.043m^2 + 0.76m + 0.29$$

when m is a degree of overlapping of images and is equal to $X_0/D$, in which D is a diameter of each lens, and $X_0$ is a radius of a view field generated by each lens.

18. A method of producing a rod lens array, comprising the steps of: arraying a large number of rod lens elements in a plurality of rows; and filling gaps with a resin to thereby combine said large number of rod lens elements into one unit, wherein a number N of lens rows is selected to be an integer value given by an expression:

$$N = INT\left\{\frac{1 + \sqrt{1 + \frac{64}{3}\{f(m)\}^2}}{2}\right\}$$ [Expression 2]

in which f(m) is given by an expression:

$$f(m) = -0.039m^2 + 0.98m + 0.023$$

when $\underline{m}$ is a degree of overlapping of images and is equal to $X_0/D$, in which D is a diameter of each lens, and $X_0$ is a radius of a view field generated by each lens.

19. A method of producing a rod lens array, comprising the steps of: arraying a large number of rod lens elements in a plurality of rows; and filling gaps with a resin to thereby combine said large number of rod lens elements into one unit, wherein a number N of lens rows is selected to be an integer value given by an expression:

$$N = INT\left\{\frac{0.99 + \sqrt{1 + \frac{64}{3}m^2}}{2}\right\}$$ [Expression 3]

when $\underline{m}$ is the degree of overlapping of images and is equal to $X_0/D$, in which D is a diameter of each lens, and $X_0$ is a radius of a view field generated by each lens.

* * * * *